US011388173B2

(12) United States Patent
Fried et al.

(10) Patent No.: US 11,388,173 B2
(45) Date of Patent: *Jul. 12, 2022

(54) MEETING JOIN FOR MEETING DEVICE

(71) Applicant: Microsoft Technology Licensing, LLC, Redmond, WA (US)

(72) Inventors: Chaim Fried, Brooklyn, NY (US); Anton W. Krantz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/940,136

(22) Filed: Jul. 27, 2020

(65) Prior Publication Data

US 2021/0014237 A1    Jan. 14, 2021

Related U.S. Application Data

(63) Continuation of application No. 15/959,872, filed on Apr. 23, 2018, now Pat. No. 10,764,302, which is a continuation of application No. 14/657,918, filed on Mar. 13, 2015, now abandoned.

(51) Int. Cl.
*H04L 9/40* (2022.01)
*G06Q 10/10* (2012.01)

(52) U.S. Cl.
CPC .......... *H04L 63/107* (2013.01); *G06Q 10/10* (2013.01); *G06Q 10/1095* (2013.01); *H04L 63/08* (2013.01); *H04L 63/10* (2013.01)

(58) Field of Classification Search
CPC .... G06Q 10/10; G06Q 10/101; G06Q 10/103; G06Q 10/1095; H04L 12/1813–1822; H04L 63/08–0892; H04L 63/10–108; H04L 63/20–205; H04L 65/403–4053;

(Continued)

(56) References Cited

U.S. PATENT DOCUMENTS

2009/0055475 A1    2/2009  Sekaran et al.
2012/0185291 A1*   7/2012  Ramaswamy ..... G06Q 10/1095
                                             705/7.19

(Continued)

OTHER PUBLICATIONS

"U.S. Appl. No. 15/959,818, Final Office Action dated Dec. 23, 2019", 18 pgs.

(Continued)

*Primary Examiner* — Kevin Bechtel
(74) *Attorney, Agent, or Firm* — Schwegman Lundberg & Woessner, P.A.

(57) ABSTRACT

Various embodiments enable an application on a first device to log into an online meeting in association with a trusted entity, such as a trusted user. Once trust is established between the trusted entity and the meeting domain, such as an enterprise domain, permissions can be assigned to a meeting device, by virtue of the trust relationship with the trusted entity, to enable the meeting device to join the meeting as a participant, thus allowing the meeting device to bypass an initial join process such as a meeting lobby and the like. By virtue of the assigned permissions, the meeting device may take control of the meeting and control the experience for others in the meeting as a fleeting organizer or some other permission-centric role.

20 Claims, 6 Drawing Sheets

(58) Field of Classification Search
CPC ... H04W 4/02–029; H04W 12/06–069; H04W 48/04
See application file for complete search history.

(56) References Cited

U.S. PATENT DOCUMENTS

| | | | |
|---|---|---|---|
| 2013/0290416 A1* | 10/2013 | Nelson | H04L 67/10 709/204 |
| 2015/0109399 A1* | 4/2015 | Kusch | H04N 7/15 348/14.02 |

OTHER PUBLICATIONS

"U.S. Appl. No. 15/959,846, Final Office Action dated Dec. 23, 2019", 18 pgs.
"U.S. Appl. No. 15/959,818, Notice of Allowance dated May 6, 2020", 9 pgs.
"Cisco TelePresence Video Systems", [online]. Retrieved from the Internet: <URL: https://www.cisco.com/c/dam/en/us/td/docs/telepresence/endpoint/ex-series/tc5/getting_started_guide/video_systems_getting_started_guide_tc50.pdf>, (Nov. 2011), 42 pgs.

* cited by examiner

MEETING JOIN FOR MEETING DEVICE

CROSS-REFERENCE TO RELATED APPLICATION

This application is a continuation of U.S. patent application Ser. No. 15/959,872, filed Apr. 23, 2018; which application is a continuation of U.S. patent application Ser. No. 14/657,918, filed Mar. 13, 2015, which applications are incorporated by reference herein in their entirety.

BACKGROUND

Online meetings have become increasingly more popular in the last several years. Online meetings enable people at different locations to meet and collaborate in a high-quality meeting experience. As technology associated with online meetings evolves, challenges continue to be posed to continue to improve the manner in which online meetings can be conducted and the user experience. For example, challenges continue to be posed to enable meeting rooms and meeting devices to easily join online meetings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments enable an application on a first device to log into an online fleeting in association with a trusted entity, such as a trusted user. Once trust is established between the trusted entity and the meeting domain, such as an enterprise domain, permissions can be assigned to a meeting device, by virtue of the trust relationship with the trusted entity, to enable the meeting device to join the meeting as a participant, thus allowing the meeting device to bypass an initial join process such as a meeting lobby and the like. By virtue of the assigned permissions, the meeting device may take control of the meeting and control the experience for others in the meeting as a fleeting organizer or some other permission-centric role.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable an application on a first device to log into an online meeting in association with a trusted entity, such as a trusted user. Once trust is established between the trusted entity and the meeting domain, such as an enterprise domain, permissions can be assigned to a meeting device, by virtue of the trust relationship with the trusted entity, to enable the meeting device to join the meeting as a participant, thus allowing the meeting device to bypass an initial join process such as a meeting lobby and the like. By virtue of the assigned permissions, the meeting device may take control of the meeting and control the experience for others in the meeting as a meeting organizer or some other permission-centric role.

In this way, online meeting flexibility is improved by virtue of the fact that totally unauthenticated meeting devices can assume an identity for a specific meeting and be trusted by virtue of the trust relationship that is established. Alternately, a meeting device need not necessarily assume an identity. Rather, the meeting device can be granted permissions associated with a particular user who initiated the meeting join. The permissions can be assigned to the particular meeting session for the connection of the meeting device or to the device of the user who is joining the meeting. When the meeting concludes, the meeting device can return to an unauthenticated state. This can greatly increase the security associated with conference room or other meeting-based computing systems. Moreover, the user's experience is enhanced by providing the user with different online meeting options which are not necessarily constrained to meeting in traditional meeting rooms, such as corporate meeting rooms and the like.

In the following discussion, an example environment is first described that is operable to employ the techniques described herein. The techniques may be employed in the example environment, as well as in other environments.

Example Environment

Figure 1:
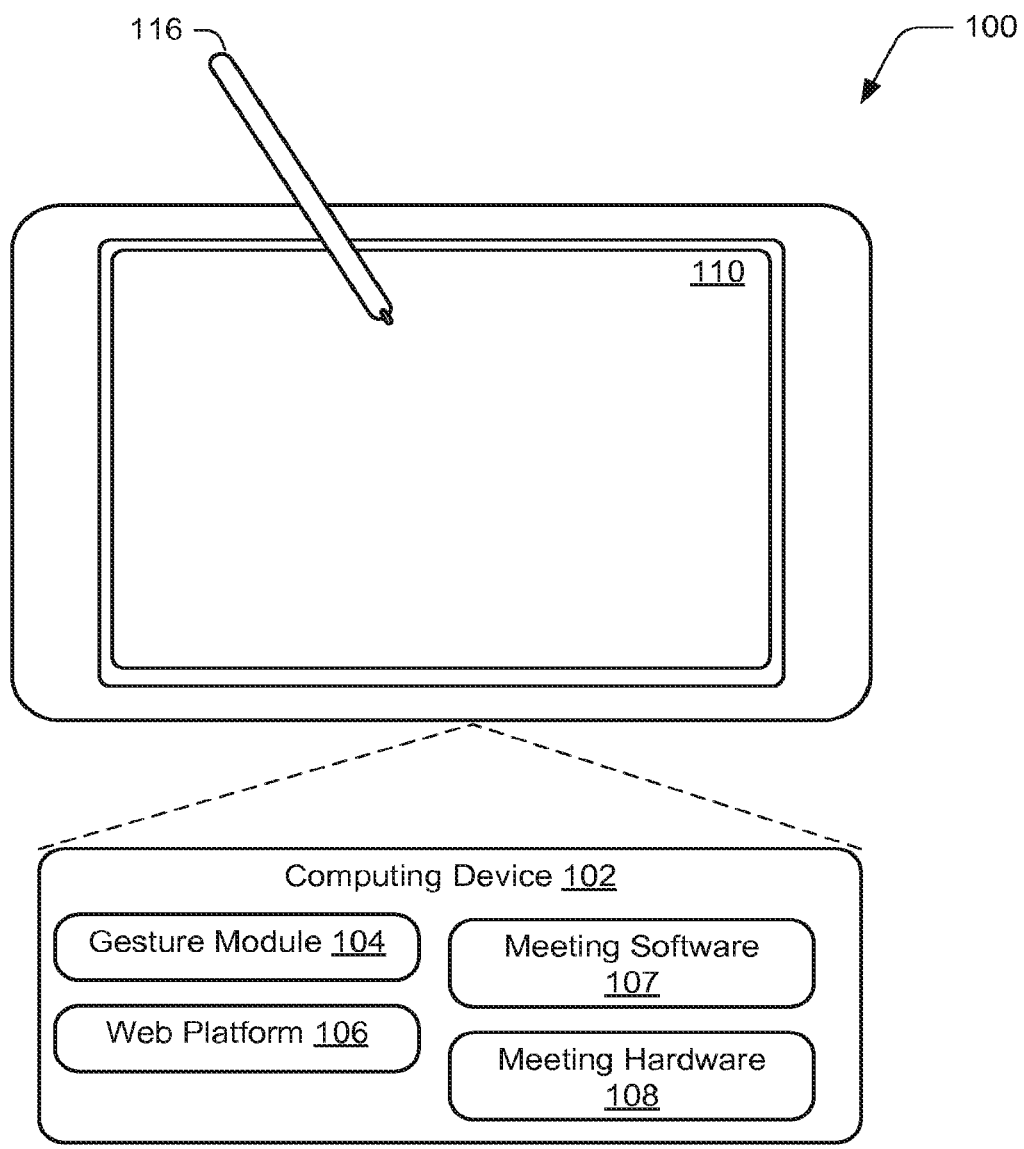
FIG. 1 is an illustration of an example meeting device in accordance with one or more embodiments.

FIG. 1 is an illustration of an environment 100 in an example implementation that is operable to employ the techniques as described herein. The illustrated environment 100 includes a computing device 102 that serves as a meeting device that may be configured in a variety of ways. In this example, meeting device 102 represents a computing device that is utilized to plan and/or conduct a meeting. The meeting device 102 can typically reside in a meeting room or conference room in which many different types of meetings can take place. Alternately or additionally, the meeting device can reside in a public place such as a hotel, airport, and the like.

Figure 2:
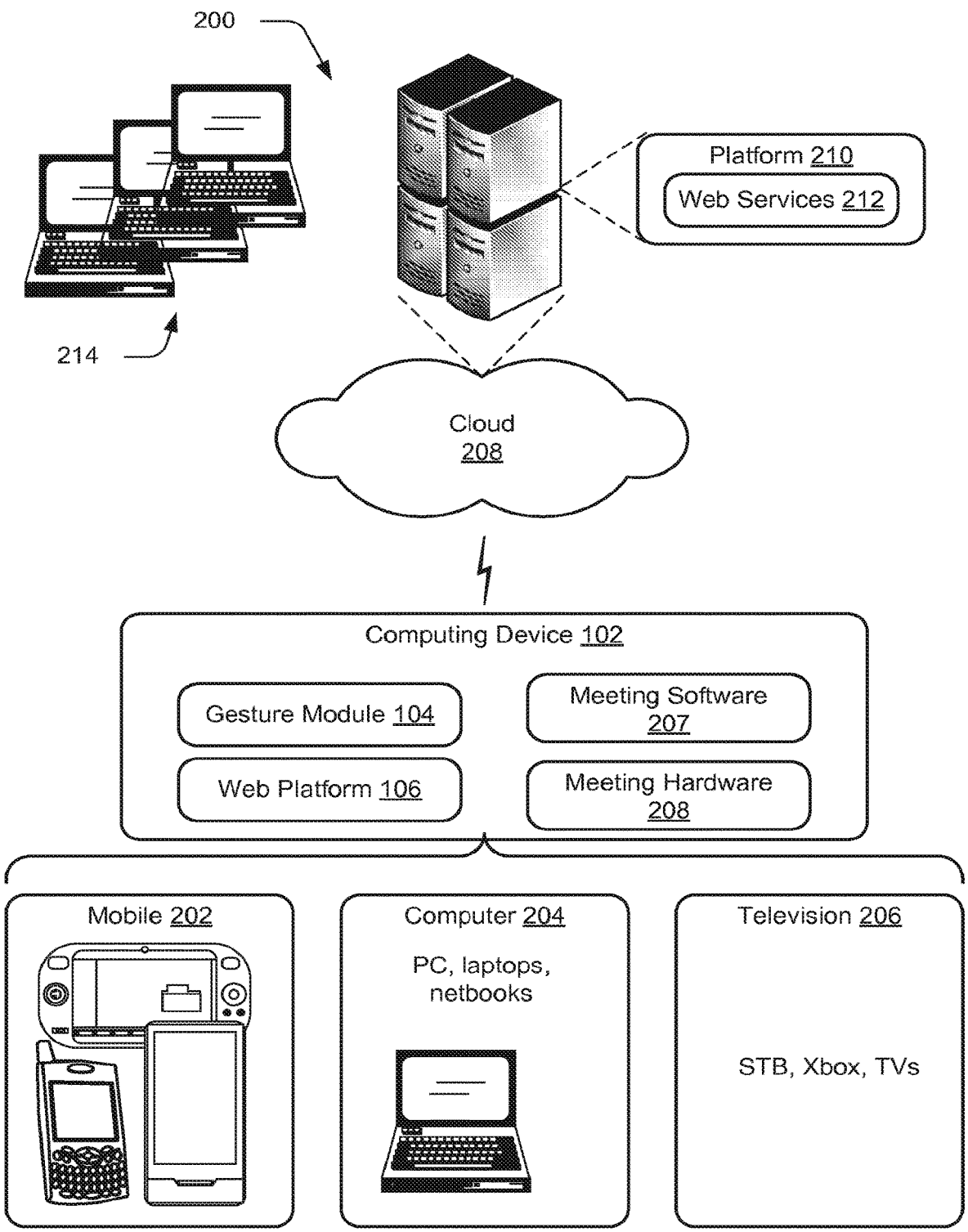
FIG. 2 is an illustration of an example environment in accordance with one or more embodiments.

The meeting device 102 may be configured as a traditional computer (e.g., a desktop personal computer, laptop computer, and so on), a mobile station, a wireless phone, a netbook, a handheld device, and so forth as further described in relation to FIG. 2. Thus, the meeting device 102 may range from full resource devices with substantial memory and processor resources (e.g., personal computers) to a low-resource device with limited memory and/or processing resources. The meeting device 102 also includes software that causes the meeting device 102 to perform one or more operations as described below. In at least some embodiments, the meeting device 102 is a large form factor device that provides a canvas for idea collaboration.

Meeting device 102 can include, by way of example and not limitation, a number of different components including a gesture module 104, a web platform 106, meeting software 107, and meeting hardware 108.

The gesture and module 104 is operational to provide gesture functionality. The gesture module 104 can be implemented in connection with any suitable type of hardware, software, firmware or combination thereof. In at least some embodiments, the gesture module 104 is implemented in software that resides on some type of computer-readable storage medium examples of which are provided below.

Gesture module 104 is representative of functionality that recognizes gestures that can be performed by one or more fingers, and causes operations to be performed that correspond to the gestures. The gestures may be recognized by module 104 in a variety of different ways. For example, the gesture module 104 may be configured to recognize a touch input, such as a finger of a user's hand as proximal to display device 110 of the meeting device 102 using touchscreen functionality.

It is to be appreciated and understood that a variety of different types of gestures may be recognized by the gesture module 104 including, by way of example and not limitation, gestures that are recognized from a single type of input (e.g., touch gestures such as the previously described drag-and-drop gesture) as well as gestures involving multiple types of inputs. For example, module 104 can be utilized to recognize single-finger gestures and bezel gestures, multiple-finger/same-hand gestures and bezel gestures, and/or multiple-finger/different-hand gestures and bezel gestures.

For example, the meeting device 102 may be configured to detect and differentiate between a touch input (e.g., provided by one or more fingers of the user's hand) and a stylus or pen input (e.g., provided by a stylus 116). The differentiation may be performed in a variety of ways, such as by detecting an amount of the display device 110 that is contacted by the finger of the user's hand versus an amount of the display device 110 that is contacted by the stylus 116.

Thus, the gesture module 104 may support a variety of different gesture techniques through recognition and leverage of a division between stylus and touch inputs, as well as different types of touch inputs.

The web platform 106 is a platform that works in connection with content of the web, e.g. public content. A web platform 106 can include and make use of many different types of technologies such as, by way of example and not limitation, URLs, HTTP, REST, HTML, CSS, JavaScript, DOM, and the like. The web platform 106 can also work with a variety of data formats such as XML, JSON, and the like. Web platform 106 can include various web browsers, web applications (i.e. "web apps"), and the like. When executed, the web platform 106 allows the computing device to retrieve web content such as electronic documents in the form of webpages (or other forms of electronic documents, such as a document file, XML file, PDF file, XLS file, etc.) from a Web server and display them on the display device 110. It should be noted that meeting device 102 could be any computing device that is capable of displaying Web pages/documents and connect to the Internet.

Meeting software 107 is representative of software that enables meetings to be conducted using various features which can include, by way of example and not limitation, instant messaging, Voice over IP, video conferencing, and the like. The meeting software can also include such things as a cloud-based whiteboard tool that enables meeting participants to write upon the display device 110.

Meeting hardware 108 is representative of hardware that enables meetings to be conducted as described above and below. The hardware can include, by way of example and not limitation, built-in sensors to help the meeting device wakeup when a person is in close proximity and track a person's movement so that one or more cameras (e.g., 1080p cameras on each side of the meeting device) can follow the person. In addition, the meeting hardware 108 can work in concert with the meeting software 107 to provide meeting starts using a single touch. The hardware and software of the meeting device can also allow participants to share content wirelessly, thus making meetings engaging and productive. The meeting hardware 108 can also include a built-in microphone array.

FIG. 2 illustrates an example system 200 showing the components of FIG. 1, e.g., fleeting software 107 and meeting hardware 108, as being implemented in an environment where multiple devices are interconnected through a central computing device. The meeting software 107 and meeting hardware 108 can enable the meeting device to participate in a meeting using various technologies including, by way of example and not limitation, instant messaging, Voice over IP, video conferencing, whiteboard functionality, content sharing and the like.

The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the meeting device 102 may be configured in a variety of different ways, such as for mobile 202, computer 204, and television 206 uses. Each of these configurations has a generally corresponding screen size and thus the meeting device 102 may be configured as one of these device classes in this example system 200. For instance, the meeting device 102 may assume the mobile 202 class of device which includes mobile telephones, music players, game devices, and so on. The meeting device 102 may also assume a computer 204 class of device that includes personal computers, laptop computers, netbooks, tablets, large form factor devices, and so on. The television 206 configuration includes configurations of device that involve display in a casual environment, e.g., televisions, set-top boxes, game consoles, and so on. Thus, the techniques described herein may be supported by these various configurations of the meeting device 102 and are not limited to the specific examples described in the following sections.

As described above, meeting device 102 includes meeting software 107 that operates as described above and below.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the meeting device 102 with other computing devices. The platform 210 may also serve to abstract scaling of resources to provide a corresponding level of scale to encountered demand for the web services 212 that are implemented via the platform 210. Web services 212 can include a meeting service that is configured to enable multiple different individuals to participate in an online meeting.

Thus, the cloud 208 is included as a part of the strategy that pertains to software and hardware resources that are made available to the meeting device 102 via the Internet or other networks. For example, aspects of the meeting software 107 may be implemented in part on the meeting device 102 as well as in a distributed fashion via platform 210 that supports web services 212.

In addition, system 200 can include one or more remote computing devices 214 associated with remote participants who can participate in a meeting organized and conducted through meeting device 102 or a different meeting device. Each of the remote computing devices 214 can execute a meeting client that enables communication with meeting software 107.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

For example, the computing device may also include an entity (e.g., software) that causes hardware or virtual machines of the computing device to perform operations, e.g., processors, functional blocks, and so on. For example, the computing device may include a computer-readable medium that may be configured to maintain instructions that cause the computing device, and more particularly the operating system and associated hardware of the computing device to perform operations. Thus, the instructions function to configure the operating system and associated hardware to perform the operations and in this way result in transformation of the operating system and associated hardware to perform functions. The instructions may be provided by the computer-readable medium to the computing device through a variety of different configurations.

One such configuration of a computer-readable medium is a signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

In the discussion that follows, a section entitled "Meeting Join for Meeting Device" describes how meeting devices can be joined to a meeting by a trusted entity in accordance with one or more embodiments. Next, a section entitled "Example Methods" describes example methods in accordance with one or more embodiments. Last, a section entitled "Example Meeting Device" describes aspects of an example device that can be utilized to implement one or more embodiments.

Having considered an example operating environment, consider now a discussion of how a meeting device can be joined to a meeting in accordance with one or more embodiments.

Meeting Join for Meeting Device

Various embodiments enable an application on a first device to log into an online meeting in association with a trusted entity, such as a trusted user. Once trust is established between the trusted entity and the meeting domain, such as an enterprise domain, permissions can be assigned to a meeting device, by virtue of the trust relationship with the trusted entity, to enable the meeting device to join the meeting as a participant, thus allowing the meeting device to bypass an initial join process such as a meeting lobby and the like. By virtue of the assigned permissions, the meeting device may take control of the meeting and control the experience for others in the meeting as a meeting organizer or some other permission-centric role.

Figure 3:
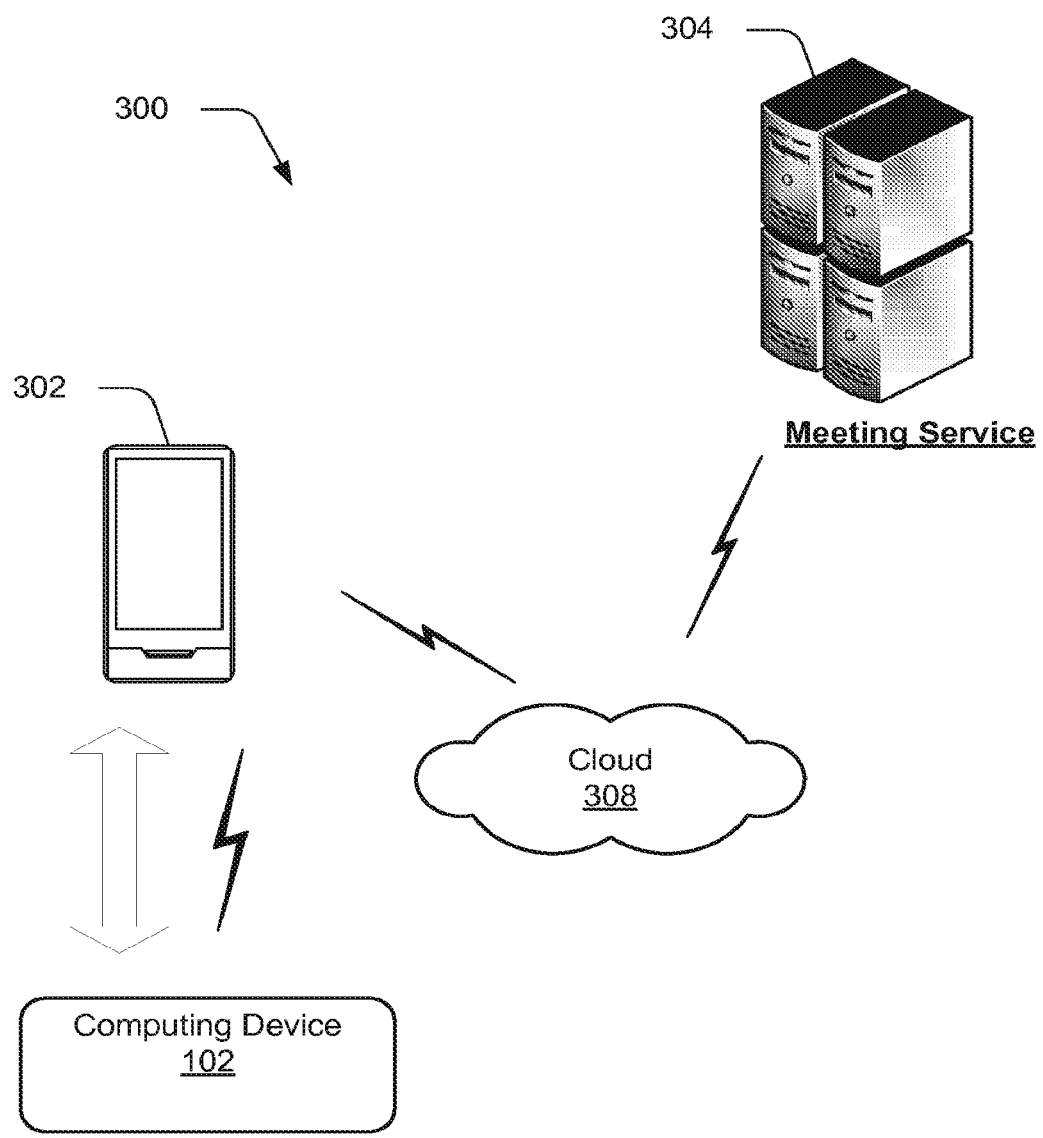
FIG. 3 is an example system in accordance with one or more embodiments.

FIG. 3 illustrates a system in accordance with one or more embodiments generally at 300. In this particular example, system 300 includes a first device 302, a computing device 102 that serves as a meeting device as described above and below, and a meeting service 304. The first device 302 and the meeting device can communicate with the meeting service 304 by way of any suitably-configured network including, by way of example and not limitation, the Internet which is represented by cloud 308.

The first device 302 can comprise any suitable type of device such as, by way of example and not limitation, a portable device such as a tablet computer, cell phone, smart phone, laptop, and the like. In the illustrated and described embodiment, the first device 302 is associated with a trusted entity. A trusted entity can include, by way of example and not limitation, a trusted user having credentials, a trusted application, a trusted software entity, and the like.

The computing device 102 i.e., the meeting device, is typically an unauthenticated device that has no security credentials with respect to a meeting domain in which a meeting is to take place. That is, by itself, computing device 102 has no way to join a particular meeting that it is about to be able to join with the help of first device 302. Accordingly, computing device 102 can be considered as untrusted.

The process about to be described can be thought of as including a two-part process. First, a control relationship is established between first device 302 and computing device 102. Second, once the control relationship is established, and based on the trusted entity associated with the first device 302, computing device 102 can be admitted to a meeting.

Establishing a Control Relationship

In at least some embodiments, prior to establishing a control relationship between first device 302 and computing device 102, a trust relationship is established between first device 302 and meeting service 304. The trust relationship can be established in any suitable way. For example, a trusted entity associated with the first device can establish the trust relationship with the meeting service. For example, a trusted user can login to a particular meeting that is to be conducted by meeting service 304 and, by presenting appropriate credentials, be authenticated to the meeting domain. Other ways of establishing trust can be utilized without departing from the spirit and scope of the claimed subject matter.

The control relationship that is to be established between first device 302 and computing device 102 is, in at least some embodiments, based on locational proximity of the devices. That is, first device 302 wishes to control computing device 102 such that the computing device 102 can be admitted, in a trusted manner, to the meeting that is to be conducted by meeting service 304. Computing device 102, on the other hand, serves the role of an un-trusted, unauthenticated computing device that is to be admitted to the meeting by virtue of an "endorsement", so to speak, from first device 302.

To establish the control relationship, first device 302 will establish that it is, in fact, in locational proximity to computing device 102 in a manner that is consistent with conducting an online meeting. This control relationship can be established in any suitable way.

For example, in at least some embodiments the control relationship can be established through a process that includes at least some manual steps. Specifically, computing device 102 may display a device name and a PIN. When a user associated with first device 302 comes into proximity with computing device 102, the user can enter the device name and PIN into a suitably-configured user interface presented by online meeting software. The device name and PIN can then be transmitted to the meeting service 304. Using a look up or some other technique, the meeting service checks for the computing device 102, verifies that the PIN is correct, and passes the PIN back to the meeting device. This establishes a local trust between the first device 302 and the computing device 102. The local trust is the foundation upon which the control relationship between first device 302 and computing device 102 is built. The control relationship allows connectivity and communication between first device 302 and computing device 102. For example, the control relationship can allow for the first device 302 to actually control the computing device 102 as by muting, an muting, changing volume, disconnecting, or any other basic meeting service function that can be provided by computing device 102.

The control relationship can also be established in other ways. For example, the control relationship can be established using wireless communication, e.g., Bluetooth communication, between first device 302 and computing device 102. By way of wireless communication, information can be exchanged between the devices, in a manner similar to that described above, to automatically enable first device 302 to establish local trust with the computing device 102. Additionally, near field communication (NFC) or QR scanning can be utilized to automatically establish local trust between the devices. Such can include, by way of example and not limitation, "bump-to-connect" functionality.

Alternately, the control relationship can be established in a peer-to-peer manlier. For example, computing device 102 can obtain a token from, for example, first device 302. The computing device 102 can then present the token to the meeting service 304 in order to join the meeting. The token for this particular meeting may have been previously acquired by the first device 302 from the meeting service 304.

Now that trust has been established between the trusted entity associated with first device 302 and the meeting service 304, and local trust has been established between the first device 302 and the computing device 102, the process to admit the computing device 102 to the meeting can take place.

Admitting Meeting Device

Admitting the computing device 102 to the meeting can take place in any suitable way. For example, in at least some embodiments, the computing device 102 can have a so-called "friendly" name such as "Oaks" that is populated onto a user interface of first device 302. The "Oaks" name can map to a globally unique identity associated with computing device 102. When the user of first device selects a particular meeting to join, as by touch selecting a "join" option, a communication is transmitted to the meeting service, who is knowledgeable of the pairing between first device 302 and computing device 102. The meeting service 304 can, responsive to receiving the communication, use the globally unique identity to admit the computing device 102 to the meeting. Admission to the meeting can include establishing any suitable communication protocols between the meeting service and the meeting device.

When the computing device 102 is admitted to the meeting, it can be admitted with elevated permissions that are the same as the authenticated user of first device 302. That is, not only can the computing device 102 be admitted to the meeting, but it can be promoted in its role so that it is more than simply an anonymous meeting attendee. For example, the computing device 102 can be admitted to the meeting as a meeting organizer or meeting presenter. Accordingly, by virtue of the trust endorsement from first device 302, computing device 102 can be afforded at least two benefits. First, computing device 102 can bypass a pre-meeting admissions staging area that is normally reserved for anonymous users. Some meeting software refers to this staging area as a "lobby." Second, the computing device 102 can automatically be assigned rights and privileges other than those associated with passive, anonymous meeting attendees. This means that the user of first device 302 can quickly and efficiently begin a meeting and participate using the full resources of the computing device 102.

Having described how a meeting device can be joined to a meeting in accordance with one or more embodiments, consider now example methods in accordance with one or more embodiments.

Example Methods

Figure 4:
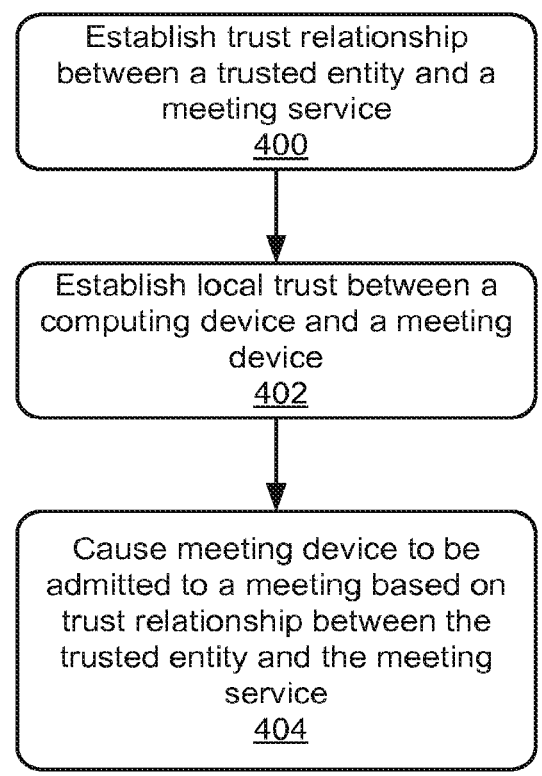
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, the method can be implemented, at least in part, by a software application executing on a client-side device such as a portable device.

Step 400 establishes a trust relationship between a trusted entity and a meeting service. Any suitable method can be utilized to establish the trust relationship. In at least some embodiments, the trusted entity is a trusted user and the trust relationship is established by virtue of the user's credentials. Step 402 establishes local trust between a computing device and a meeting device. This step can be performed in any suitable way. For example, a user's computing device can establish that it is local and proximate the meeting device in a manner consistent with conducting an online meeting. Examples of how this can be done are provided above. Step 404 causes the meeting device to be admitted to a meeting based on the trust relationship between the trusted entity and the meeting service. Examples of how this can be done are provided above.

Figure 5:
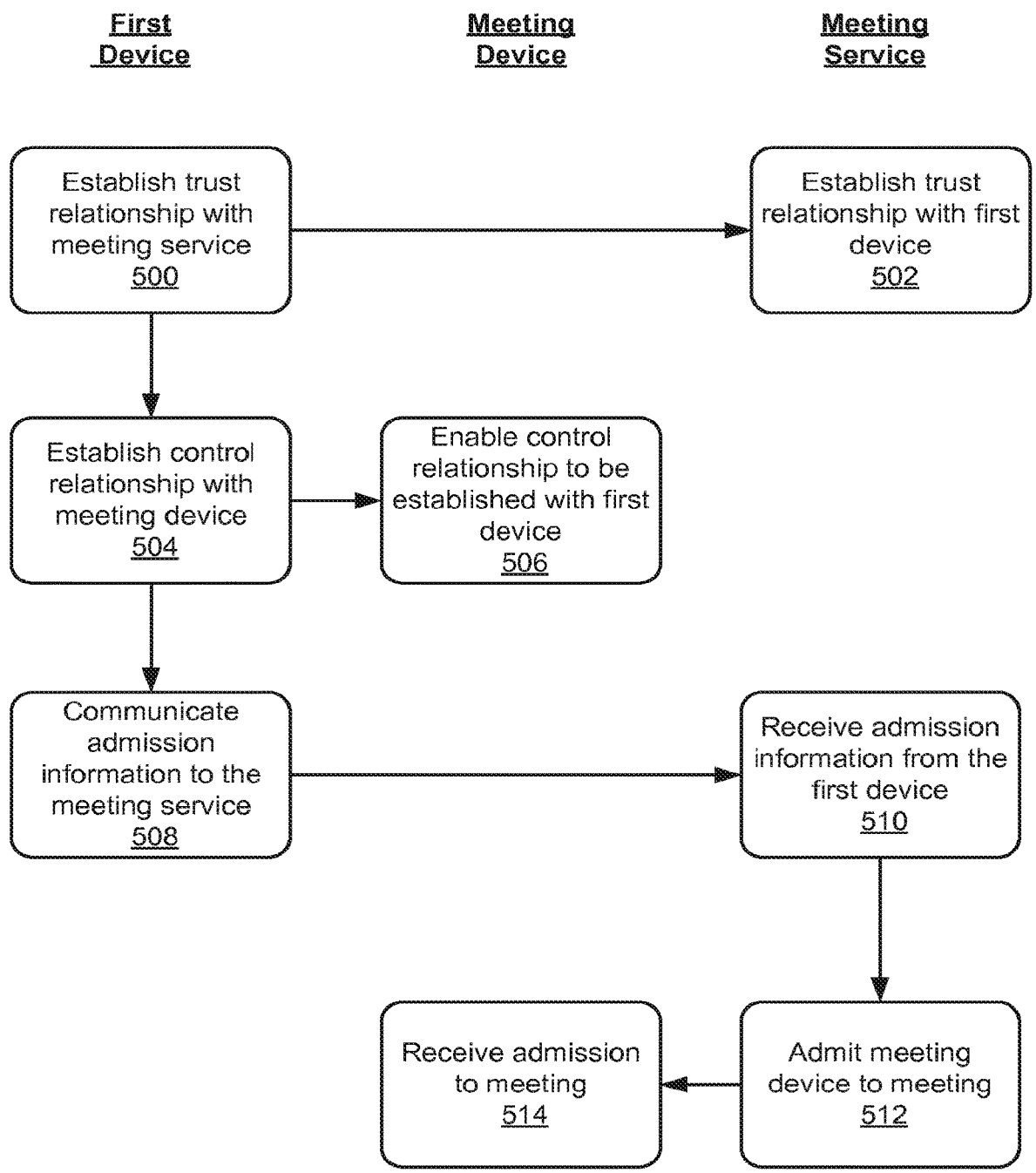
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware, or combination thereof. In at least some embodiments, the method can be implemented by different entities. These entities include a first device, a meeting device, and a meeting service. Steps that are performed by each of these entities appears under an appropriate heading—either "First Device", "Meeting Device", or "Meeting Service".

Step 500 establishes a trust relationship with a meeting service. This step can be performed in any suitable way, examples of which are provided above. For example, this step can be performed by conveying information, such as credential information, from the first device to the meeting service. This credential information can be used, for example, to enable a user or device to log into a particular online meeting.

Step 502 establishes, at the meeting service, a trust relationship with the first device. The step can be performed in any suitable way, examples of which are provided above. For example, this step can be performed by the meeting service receiving information conveyed from the first device, and using the conveyed information to authenticate the user or device and admitting the user or device into the online meeting.

Step 504 establishes a control relationship with the meeting device. The step can be performed in any suitable way examples of which are provided above. For example, the first device can receive information, e.g., a PIN, associated with the meeting device, and provide this information to the meeting service in order to enable the control relationship to be established. Alternately or additionally, the first device can provide information, e.g., a token, to the meeting device which, in turn, can be provided to the meeting service in order to enable the control relationship to be established.

Step 506 enables a control relationship to be established with the first device. This step can be performed in any suitable way. For example, this step can be performed by providing information, e.g., a PIN, from the meeting device to the first device to enable the first device to establish the control relationship. Alternately, this step can be performed by receiving information, e.g., a token, from the first device and providing this information to the meeting service in order to enable the control relationship to be established.

Step 508 communicates, by the first device, admission information to the meeting service. This step can be performed by communicating information associated with the meeting device to the meeting service. This information can include, by way of example and not limitation, the globally unique identity associated with the meeting device.

Step 510 receives, at the meeting service, admission information from the first device. Responsive to receiving the admission information, step 512 admits the meeting device to the meeting. The step can be performed in any suitable way including, by way of example and not limitation, automatically admitting the meeting device with elevated permissions, such as those associated with a trusted user of the first device or permissions that are elevated above those of a passive, anonymous meeting attendee.

Step 514 receives, by the meeting device, admission to the meeting. This permits the user of the first device to utilize all the resources of the meeting device to conduct the meeting. This can include serving in the role of presenter or meeting organizer with all rights and privileges associated therewith.

Having described example methods in accordance with one or more embodiments, consider now an example meeting device in accordance with one or more embodiments.

Example Meeting Device

Figure 6:
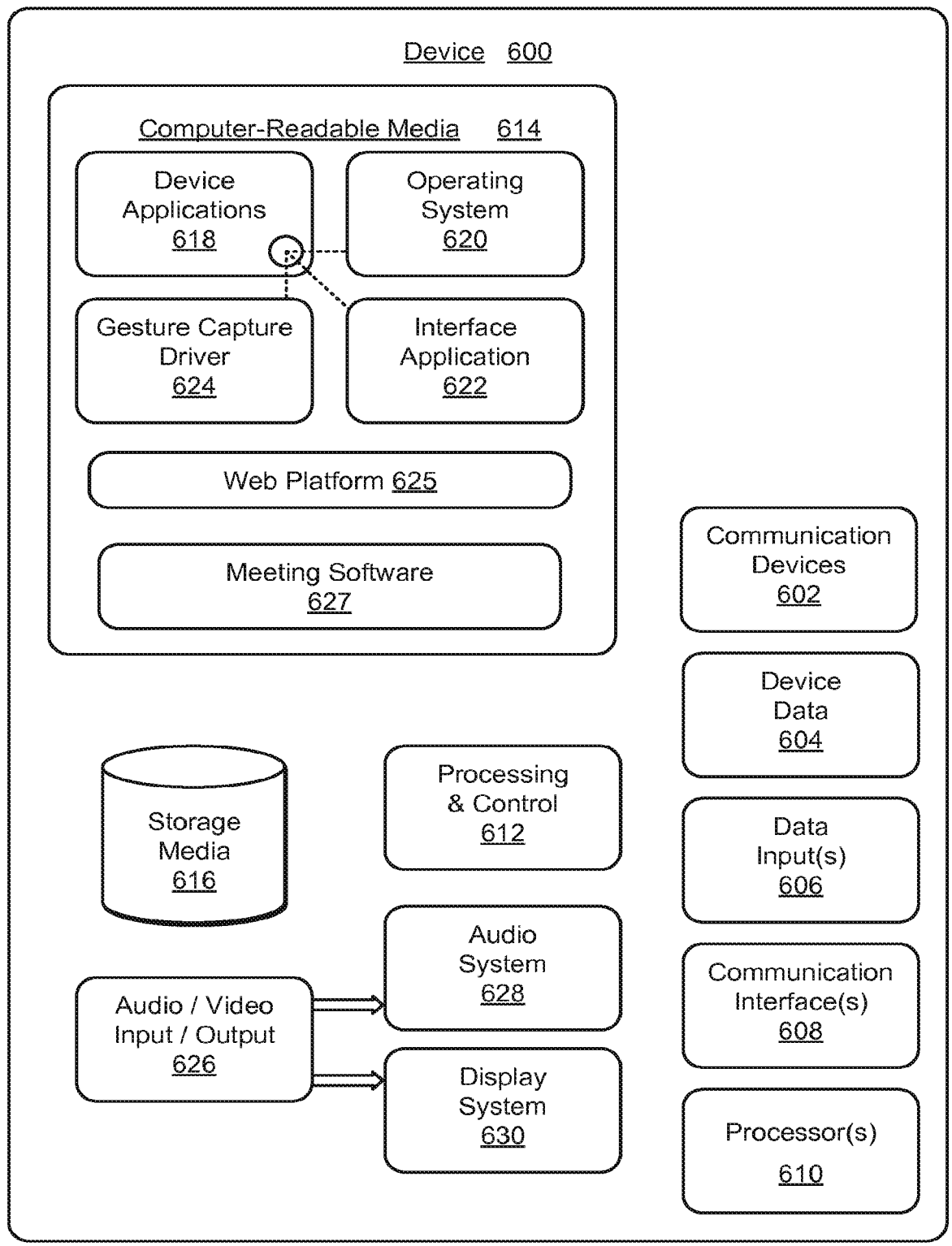
FIG. 6 illustrates an example meeting device that can be utilized to implement various embodiments described herein.

FIG. 6 illustrates various components of an example meeting device 600 that can be implemented as any type of computing device as described with reference to FIGS. 1 and 2 to implement embodiments of the techniques described herein. Aspects of device 600 can be utilized to implement a computing device that executes a meeting service as described herein.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600, such as in the context of the meeting.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the techniques described herein. In this example, the device applications 618 include an interface application 622 and a gesture capture driver 624 that are shown as software modules and/or computer applications. The gesture capture driver 624 is representative of software that is used to provide an interface with a device configured to capture a gesture, such as a touchscreen, track pad, camera, and so on. Alternatively or in addition, the interface application 622 and the gesture capture driver 624 can be implemented as hardware, software, firmware, or any combination thereof. Additionally, computer readable media 614 can include a web platform 625 and meeting software 627 that functions as described above.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

Example Implementations

Example implementations described herein include, but are not limited to, one or any combination of one or more of the following example:

A computer-implemented method comprising: establishing a trust relationship between a trusted entity and a meeting service; establishing local trust between a computing device and a meeting device; causing the meeting device to be admitted to the meeting based on the trust relationship between the trusted entity and the meeting service, and the local trust between the computing device and the meeting device.

A method as described above, wherein the trusted entity comprises a trusted user and the trust relationship is established by virtue of user credentials of the trusted user.

A method as described above, wherein establishing local trust is performed by establishing that the computing device is proximate the meeting device in a manner consistent with conducting an online meeting.

A method as described above, wherein the meeting device has no security credentials with respect to a meeting domain in which the meeting takes place.

A method as described above, wherein establishing local trust comprises, at least in part, transmitting a PIN associated with the meeting device to the meeting service.

A method as described above, wherein establishing local trust comprises receiving entry of a PIN associated with the meeting device and transmitting the PIN to the meeting service.

A method as described above, wherein establishing local trust is performed, at least in part, automatically by way of wireless communication between the computing device and the meeting device.

A computer-implemented method comprising: establishing, by a first device, a trust relationship with the meeting service; establishing, by the first device, a control relationship with a meeting device; communicating admission information to the meeting service effective to enable the meeting service to admit the meeting device to an online meeting, admission to the online meeting being based on both the trust relationship and the control relationship.

A method as described above, wherein said establishing a trust relationship is performed by conveying credential information to enable a user to log into an online meeting.

A method as described above, wherein establishing the control relationship comprises receiving information from the meeting device and conveying this information to the meeting service.

A method as described above, wherein establishing the control relationship comprises providing information to the meeting device effective to enable the meeting device to provide information to the meeting service.

A method as described above, wherein establishing the control relationship comprises receiving a PIN from the meeting device and conveying the PIN to the meeting service.

A method as described above, wherein establishing the control relationship comprises establishing the control relationship based on location proximity between the first device and the meeting device.

A method as described above, wherein said communicating admission information is effective to cause the meeting device to be admitted to the online meeting with elevated permissions.

A method as described above, wherein said communicating admission information is effective to cause the meeting device to be admitted to the online meeting by bypassing a pre-meeting admissions staging area.

A device comprising: one or more processors; one or more computer readable media; computer-readable instructions embodied on the one or more computer readable media and executable by the one or more processors to implement a meeting service configured to perform operations comprising: establishing a trust relationship with a first device; receiving admission information from the first device, the admission information being associated with an untrusted meeting device; and based on the trust relationship and the admission information, admitting the meeting device to the meeting.

A device as described above, wherein establishing the trust relationship comprises receiving information associated with a trusted entity and using the information to provide admission to an online meeting.

A device as described above, wherein said admitting comprises admitting the meeting device with elevated permissions that are the same as a trusted entity associated with the first device.

A device as described above, wherein said admitting comprises enabling the meeting device to bypass a pre-meeting admissions staging area.

A device as described above, wherein said admitting comprises admitting the meeting device with permissions associated with a meeting organizer or presenter.

A system comprising: one or more processors; one or more computer-readable storage media storing an application which, when executed by the one or more processors, cause the one or more processors to perform operations comprising: establishing a trust relationship with a meeting service; establishing a control relationship with a meeting device; and communicating admission information to the meeting service effective to enable the meeting service to admit the meeting device to an online meeting, admission to the online meeting being based on both the trust relationship and the control relationship.

A system as described above, wherein said establishing a trust relationship is performed by conveying credential information to enable a user to log into an online meeting.

A system as described above, wherein establishing the control relationship comprises receiving information from the meeting device and conveying this information to the meeting service.

A system as described above, wherein establishing the control relationship comprises providing information to the meeting device effective to enable the meeting device to provide information to the meeting service.

A system as described above, wherein establishing the control relationship comprises receiving a PIN from the meeting device and conveying the PIN to the meeting service.

A system as described above, wherein establishing the control relationship comprises establishing the control relationship based on location proximity between the first device and the meeting device.

A system as described above, wherein said communicating admission information is effective to cause the meeting device to be admitted to the online meeting with elevated permissions.

A system as described above, wherein said communicating admission information is effective to cause the meeting device to be admitted to the online meeting by bypassing a pre-meeting admissions staging area.

A meeting device comprising: one or more processors; one or more computer-readable storage media storing an application which, when executed by the one or more processors, cause the one or more processors to perform operations comprising: enabling a control relationship to be established with a first device, the control relationship enabling, at least in part, a meeting to be conducted using the meeting device; and receiving, from a meeting service, admission to the meeting in a manner that enables a user of the first device to use the meeting device to participate in the meeting.

A meeting device as described above, wherein said enabling is performed by providing information to the first device for provision to a meeting service in order to enable the control relationship to be established.

A meeting device as described above, wherein said enabling performed by receiving information from the first device and providing the received information to a meeting service in order to enable the control relationship to be established.

A meeting device as described above, wherein receiving admission to the meeting is effective to provide the meeting device with elevated permissions.

A meeting device as described above, wherein receiving admission to the meeting is effective to provide the meeting device with elevated permissions that are the same as an authenticated user of the first device.

A meeting device as described above, wherein receiving admission to the meeting is effective to admit the meeting device as a meeting organizer or presenter.

A meeting device as described above, wherein receiving admission to the meeting is effective to enable the meeting device to bypass a pre-meeting admissions stag

CONCLUSION

Various embodiments enable an application on a first device to log into an online meeting in association with a trusted entity, such as a trusted user. Once trust is established between the trusted entity and the meeting domain, such as an enterprise domain, permissions can be assigned to a meeting device, by virtue of the trust relationship with the trusted entity, to enable the meeting device to join the meeting as a participant, thus allowing the meeting device to bypass an initial join process such as a meeting lobby and the like. By virtue of the assigned permissions, the meeting device may take control of the meeting and control the experience for others in the meeting as a meeting organizer or some other permission-centric role.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A first computing device for accessing a network-based service using a second computing device, the first computing device comprising:
   a hardware processor;
   a memory comprising instructions, which when performed by the hardware processor, cause the hardware processor to perform operations comprising:
   establishing a locational proximity to the second computing device, the locational proximity establishing that the first and second computing devices are within a threshold distance of each other;
   confirming a trust relationship with the second computing device based upon an exchange of data with the second computing device, the second computing device having authenticated with the network-based service, the trust relationship indicating an access privilege for the second computing device to access the network-based service;
   accessing the network-based service based upon the locational proximity and the trust relationship, the first computing device not authorized to access the network-based service without having first established the locational proximity and the trust relationship with the second computing device, the network-based service provided by a server computing device, the server computing device providing the network-based service by sending content between a plurality of devices; and
   responsive to accessing with the network-based service, receiving content from the network-based service.

2. The first computing device of claim 1, wherein the network-based service is a network-based meeting service and wherein the operations of receiving the content from the network-based service comprises receiving audio, visual, or audiovisual data of an online meeting created by a third computing device that is part of the online meeting.

3. The first computing device of claim 1, wherein the operations of authentication with the network-based service comprises joining the first computing device to an in-progress meeting, the second computing device already having joined the in-progress meeting.

4. The first computing device of claim 3, wherein the first computing device is a conference device and the second computing device is a mobile device of a user.

5. The first computing device of claim 1, wherein the operations of confirming the trust relationship with the second computing device comprises:
   receiving a secret through an input device of the first computing device, the secret provided by the second computing device; and
   transmitting the secret to the network-based service.

6. The first computing device of claim 1, wherein the operations of establishing the locational proximity comprises establishing a Bluetooth wireless connection with the second computing device.

7. The first computing device of claim 1, wherein the operations of establishing the locational proximity comprises establishing a Near Field Communication (NFC) wireless connection with the second computing device.

8. The first computing device of claim 1, wherein the operations of confirming the trust relationship with the second computing device comprises obtaining a token from the second computing device and wherein the operations of authenticating with the network-based service comprises sending the token to the network-based service.

9. The first computing device of claim 8, wherein the operations further comprise:
establishing a peer-to-peer connection with the second computing device, and wherein obtaining the token from the second computing device comprises receiving the token over the peer-to-peer connection.

10. The first computing device of claim 1, wherein the operations further comprise:
receiving a command from the second computing device, the command controlling a parameter related to accessing the network-based service; and
modifying the accessing of the network-based service based upon the command.

11. A method for accessing a network-based service on a first computing device using a second computing device, the method comprising:
on the first computing device:
establishing a locational proximity to the second computing device, the locational proximity establishing that the first and second computing devices are within a threshold distance of each other;
confirming a trust relationship with the second computing device based upon an exchange of data with the second computing device, the second computing device having authenticated with the network-based service, the trust relationship indicating an access privilege for the second computing device to access the network-based service;
accessing the network-based service based upon the locational proximity and the trust relationship, the first computing device not authorized to access the network-based service without having first established the locational proximity and the trust relationship with the second computing device, the network-based service provided by a server computing device, the server computing device providing the network-based service by sending content between a plurality of devices; and
responsive to accessing with the network-based service, receiving content from the network-based service.

12. The method of claim 11, wherein the network-based service is a network-based meeting service and wherein receiving the content from the network-based service comprises receiving audio, visual, or audiovisual data of an online meeting created by a third computing device that is part of the online meeting.

13. The method of claim 11, wherein authentication with the network-based service comprises joining the first computing device to an in-progress meeting, the second computing device already having joined the in-progress meeting.

14. The method of claim 13, wherein the first computing device is a conference device and the second computing device is a mobile device of a user.

15. The method of claim 11, wherein confirming the trust relationship with the second computing device comprises:
receiving a secret through an input device of the first computing device, the secret provided by the second computing device; and
transmitting the secret to the network-based service.

16. The method of claim 11, wherein establishing the locational proximity comprises establishing a Bluetooth wireless connection with the second computing device.

17. The method of claim 11, wherein establishing the locational proximity comprises establishing a Near Field Communication (NFC) wireless connection with the second computing device.

18. The method of claim 11, wherein confirming the trust relationship with the second computing device comprises obtaining a token from the second computing device and wherein authenticating with the network-based service comprises sending the token to the network-based service.

19. A first computing device for accessing a network-based service using a second computing device, the first computing device comprising:
means for establishing a locational proximity to the second computing device, the locational proximity establishing that the first and second computing devices are within a threshold distance of each other;
means for confirming a trust relationship with the second computing device based upon an exchange of data with the second computing device, the second computing device having authenticated with the network-based service, the trust relationship indicating an access privilege for the second computing device to access the network-based service;
means for accessing the network-based service based upon the locational proximity and the trust relationship, the first computing device not authorized to access the network-based service without having first established the locational proximity and the trust relationship with the second computing device, the network-based service provided by a server computing device, the server computing device providing the network-based service by sending content between a plurality of devices; and
means for, responsive to accessing with the network-based service, receiving content from the network-based service.

20. The first computing device of claim 19, wherein the network-based service is a network-based meeting service and wherein the means for receiving the content from the network-based service comprises means for receiving audio, visual, or audiovisual data of an online meeting created by a third computing device that is part of the online meeting.

* * * * *